United States Patent
Kralick

(10) Patent No.: US 6,733,910 B1
(45) Date of Patent: May 11, 2004

(54) FUEL CELL COOLANT TANK SYSTEM

(75) Inventor: James H. Kralick, Albany, NY (US)

(73) Assignee: Power Plug Inc., DE (US)

( * ) Notice: Subject to any disclaimer, the term of this patent is extended or adjusted under 35 U.S.C. 154(b) by 7 days.

(21) Appl. No.: 09/703,082

(22) Filed: Oct. 31, 2000

(51) Int. Cl.$^7$ ................................................ H01M 8/12
(52) U.S. Cl. ............................. 429/26; 429/12; 429/13; 429/25
(58) Field of Search ............................ 429/12, 13, 25, 429/26

(56) References Cited

U.S. PATENT DOCUMENTS

| | | |
|---|---|---|
| 3,009,327 A | 11/1961 | Weil |
| 3,172,784 A | 3/1965 | Blackmer |
| 3,411,951 A | 11/1968 | Gelting |
| 3,801,372 A | 4/1974 | Shaw |
| 3,880,670 A | 4/1975 | Shinn |
| 3,945,844 A | 3/1976 | Nickols, Jr. |
| 4,578,324 A | 3/1986 | Koehler et al. |
| 4,824,738 A | 4/1989 | Misage et al. |
| 4,824,740 A | 4/1989 | Abrams et al. |
| 5,082,753 A | 1/1992 | Shimizu et al. |
| 6,053,132 A * | 4/2000 | Evans ................... 123/41.42 |
| 6,322,919 B1 * | 11/2001 | Yang et al. .................. 429/32 |

* cited by examiner

*Primary Examiner*—Patrick Ryan
*Assistant Examiner*—Dah-Wei Yuan
(74) *Attorney, Agent, or Firm*—Fish & Richardson P.C.

(57) ABSTRACT

A fuel cell coolant tank system includes a fuel cell stack including a plurality of fuel cells, a coolant manifold, and a coolant outlet manifold. A coolant expansion tank above the fuel cell stack has an input connected to the coolant inlet manifold of the fuel cell stack and an output connected to the coolant outlet manifold of the fuel cell stack.

6 Claims, 2 Drawing Sheets

FUEL CELL COOLANT TANK SYSTEM

BACKGROUND OF THE INVENTION

This invention relates to a fuel cell coolant system.

A fuel cell can convert chemical energy to electrical energy by promoting a chemical reaction between two gases.

One type of fuel cell includes a cathode flow field plate, an anode flow field plate, a membrane electrode assembly disposed between the cathode flow field plate and the anode flow field plate, and two gas diffusion layers disposed between the cathode flow field plate and the anode flow field plate. A fuel cell system made up of multiple fuel cells also typically includes one or more coolant flow field plates disposed adjacent the exterior of the anode flow field plates and/or the exterior of the cathode flow field plates.

Each flow field plate has an inlet region, an outlet region, and open-faced channels connecting the inlet region to the outlet region and providing a way for distributing the gases to the membrane electrode assembly.

The membrane electrode assembly usually includes a solid electrolyte (e.g., a proton exchange membrane, commonly abbreviated as a PEM) between a first catalyst and a second catalyst. One gas diffusion layer is between the first catalyst and the anode flow field plate, and the other gas diffusion layer is between the second catalyst and the cathode flow field plate.

During operation of the fuel cell, a reactant gas, e.g., hydrogen, enters the anode flow field plate at the inlet region of the anode flow field plate and flows through the channels of the anode flow field plate toward the outlet region of the anode flow field plate. The other gas, e.g., air, enters the cathode flow field plate at the inlet region of the cathode flow field plate and flows through the channels of the cathode flow field plate toward the cathode flow field plate outlet region.

As the reactant gas flows through the channels of the anode flow field plate, the reactant gas passes through the anode gas diffusion layer and interacts with the anode catalyst. Similarly, as the other gas flows through the channels of the cathode flow field plate, the other gas passes through the cathode gas diffusion layer and interacts with the cathode catalyst.

The anode catalyst interacts with the reactant gas to catalyze the conversion of the reactant gas to reaction intermediates. The reaction intermediates include ions and electrons. The cathode catalyst interacts with the other gas and the reaction intermediates to catalyze the conversion of the other gas to the chemical product of the fuel cell reaction.

The chemical product of the fuel cell reaction flows through a gas diffusion layer to the channels of a flow field plate (e.g., the cathode flow field plate). The chemical product then flows along the channels of the flow field plate toward the outlet region of the flow field plate.

The electrolyte provides a barrier to the flow of the electrons and gases from one side of the membrane electrode assembly to the other side of the membrane electrode assembly. However, the electrolyte allows ionic reaction intermediates to flow from the anode side of the membrane electrode assembly to the cathode side of the membrane electrode assembly.

Therefore, the ionic reaction intermediates can flow from the anode side of the membrane electrode assembly to the cathode side of the membrane electrode assembly without exiting the fuel cell. In contrast, the electrons flow from the anode side of the membrane electrode assembly to the cathode side of the membrane electrode assembly by electrically connecting an external load between the anode flow field plate and the cathode flow field plate. The external load allows the electrons to flow from the anode side of the membrane electrode assembly, through the anode flow field plate, through the load and to the cathode flow field plate.

Electrons are formed at the anode side of the membrane electrode assembly, indicating that the reactant gas undergoes oxidation during the fuel cell reaction. Electrons are consumed at the cathode side of the membrane electrode assembly, indicating that the other gas undergoes reduction during the fuel cell reaction.

For example, when hydrogen and oxygen are the two gases that are used in the fuel cell, the hydrogen flows through the anode flow field plate and undergoes oxidation. The oxygen flows through the cathode flow field plate and undergoes reduction. The specific reactions that occur in the fuel cell are represented in the following Eqs. 1–3:

$$H_2 \rightarrow 2H^+ + 2e^- \tag{1}$$

$$\tfrac{1}{2}O_2 + 2H^+ + 2e^- \rightarrow H_2O \tag{2}$$

$$H_2 + \tfrac{1}{2}O_2 \rightarrow H_2O \tag{3}$$

As shown in Eq. 1, the hydrogen forms protons ($H^+$) and electrons ($e^-$). The protons flow through the electrolyte to the cathode side of the membrane electrode assembly, and the electrons flow from the anode side of the membrane electrode assembly to the cathode side of the membrane electrode assembly through the external load. As shown in Eq. 2, the electrons and protons react with the oxygen to form water. Eq. 3 shows the overall fuel cell reaction.

In addition to forming chemical products, the fuel cell reaction produces heat. One or more coolant flow field plates are typically used to conduct the heat away from the fuel cell and maintain appropriate stack temperatures.

Each coolant flow field plate has an inlet region, an outlet region, and channels that provide fluid communication between the coolant flow field plate inlet region and the coolant flow field plate outlet region. A coolant, e.g., liquid de-ionized water or other low conductivity fluids, at a relatively low temperature enters the coolant flow field plate at the inlet region, flows through the channels of the coolant flow field plate toward the outlet region of the coolant flow field plate, and exits the coolant flow field plate at the outlet region of the coolant flow field plate. As the coolant flows through the channels of the coolant flow field plate, the coolant absorbs heat formed in the fuel cell. When the coolant exits the coolant flow field plate, the heat absorbed by the coolant is removed from the fuel cell.

To increase the electrical energy available, a plurality of fuel cells can be arranged in series to form a fuel cell stack. In a fuel cell stack, one side of a flow field plate functions as the anode flow field plate for one fuel cell while the opposite side of the flow field plate functions as the cathode flow field plate in another fuel cell. This arrangement may be referred to as a bipolar plate. The stack may also include monopolar plates such as, for example, an anode coolant flow field plate having one side that serves as an anode flow field plate and another side that serves as a coolant flow field plate. As an example, the open-faced coolant channels of an anode coolant flow field plate and a cathode coolant flow field plate may be mated to form collective coolant channels to cool the adjacent flow field plates forming fuel cells.

SUMMARY OF THE INVENTION

In one aspect of the invention, a fuel cell system includes a fuel cell stack including a plurality of fuel cells, a coolant inlet manifold, and a coolant outlet manifold. A coolant expansion tank has an input connected to the coolant inlet manifold of the fuel cell stack and an output connected to the coolant outlet manifold of the fuel cell stack.

In another aspect of the invention, a coolant expansion system includes a coolant expansion tank configured to accept coolant at an input connected to an inlet coolant manifold of a fuel cell stack, to allow gas included in the coolant to escape into an open air space above the coolant in the coolant au expansion tank, and to release coolant through an output connected to an outlet coolant manifold of the fuel cell stack.

One or more of the following advantages may be provided by one or more aspects of the invention.

Providing a coolant expansion tank allows coolant flowing through the fuel cell stack to expand into the coolant expansion tank and maintain coolant pressures within the fuel cell stack to within acceptable levels. Gases trapped in the coolant can escape into the coolant expansion tank, thereby innocuously localizing these gases in the coolant expansion tank rather than in the fuel cell stack and allowing coolant with improved heat-absorbing capacity to circulate back through the fuel cell stack. In addition, the coolant level in the fuel cell system can be monitored by observing the amount of coolant in the coolant expansion tank.

Other features and advantages of the invention will be apparent from the detailed description and the drawings.

DETAILED DESCRIPTION

Figure 1:
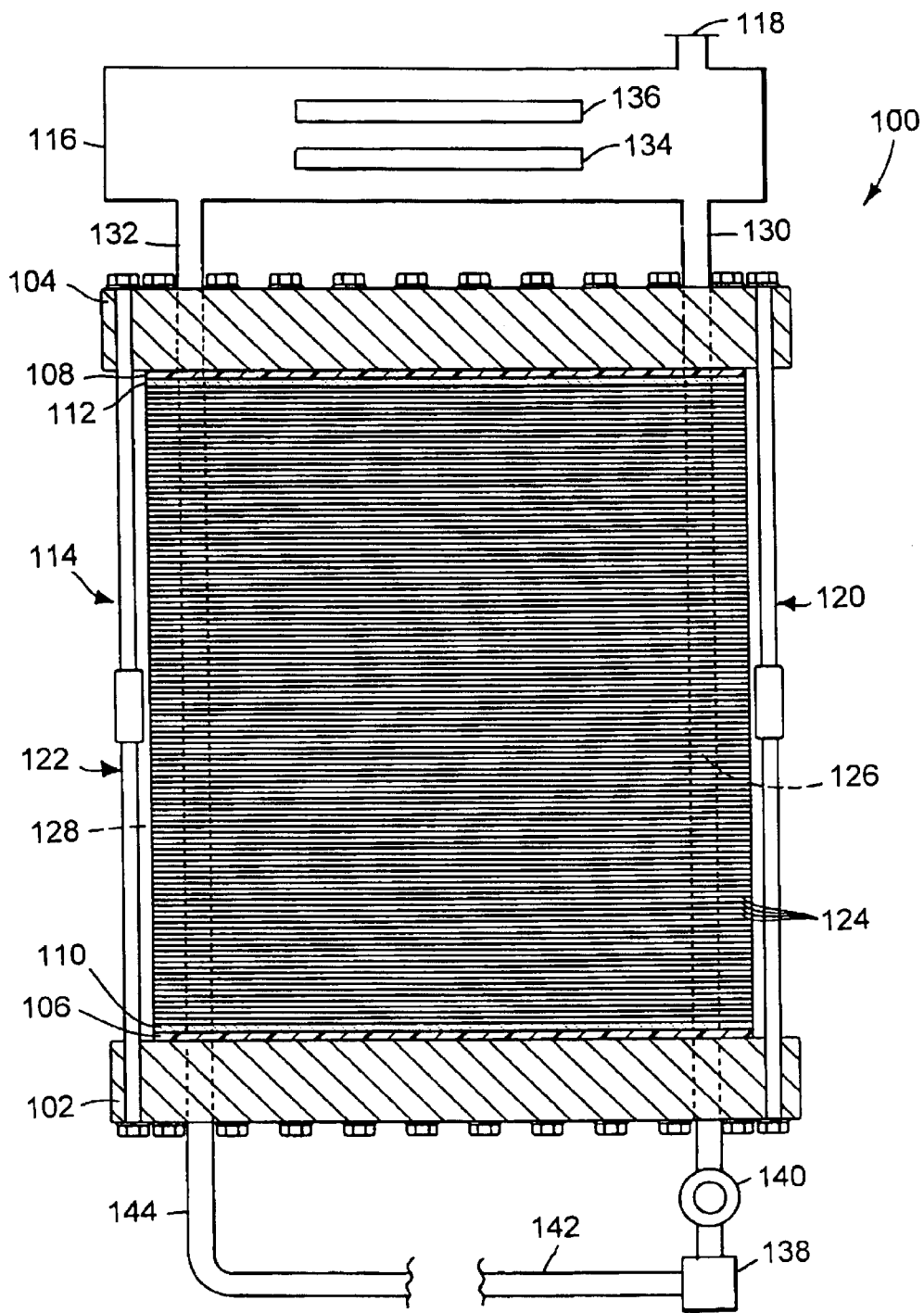
FIG. 1 shows a schematic representation of a fuel cell system including a coolant expansion tank.

Referring to FIG. 1, a fuel cell system 100 includes upper and lower end plates 102 and 104, upper and lower insulation layers 106 and 108, upper and lower current collector/conductor plates 110 and 112, and a working section 114 in the middle. System 100 also includes a coolant expansion tank 116, which, in the exemplary embodiment, is located above the upper end plate 102 at the top of the system. In alternate embodiments of the present invention, the coolant expansion tank 116 may be located at various locations within the system 100 and in various positions with respect to the working section 114. The coolant expansion tank 116 includes a pressure release valve 118. Structural members 120, 122, e.g. two tie-bolts on each side of the working area 114, compress the end plates 102 and 104 and the intermediate components together.

The working section 114 includes a plurality of fuel cells 124, e.g., eighty-eight fuel cells, although there may be more or fewer fuel cells 124 depending on design considerations. The fuel cells 124 generally form an inlet coolant manifold 126 and an outlet coolant manifold 128 for supplying coolant to, removing coolant from, and otherwise communicating and/or servicing coolant, as required within the working section 114. As reactions in the fuel cells 124 take place, coolant flows from the inlet coolant manifold 126 through each of the fuel cells 124 to the outlet coolant manifold 128. A portion of the heat produced during the fuel cell reactions is removed from the fuel cells 124 by the flowing coolant.

As the coolant is heated while removing heat from the fuel cells 124, the coolant thermally expands. Some of the coolant in the inlet coolant manifold 126 expands into the coolant expansion tank 116 via an inlet coolant line 130. The expansion tank 116, which lies parallel to the flow paths of the coolant through the fuel cells 124, provides a closed coolant system for the fuel cell system 100 that allows the coolant to expand and contract as ambient and operating conditions dictate. The coolant exits the coolant expansion tank 116 through an outlet coolant line 132 and back into the outlet coolant manifold 128. The diameter of the outlet coolant line 132 is typically smaller than the diameter of the inlet coolant line 130, though the diameters could be the same. Within the coolant expansion tank 116, a volume of trapped gases, mostly air, acts as a gas spring to compensate for thermal expansion of the coolant.

A pump 138 pumps the coolant into the inlet coolant manifold 126 from the bottom, thereby causing a pressure differential between the inlet coolant manifold 126 and the outlet coolant manifold 128. Thus, coolant flowing up into the inlet coolant manifold 126 flows through the fuel cells 124 and out through the outlet coolant manifold 128. A limited amount of coolant also flows through the coolant expansion tank 116. From the outlet coolant manifold 128, the coolant enters an outlet line 144 and flows to one or more other elements within the fuel cell system. The other elements (e.g. heat exchangers) remove heat from the coolant and either use that heat for other operational purposes or simply deliver the heat into the atmosphere. The coolant then circulates back through an inlet line 142 to the pump 138, which circulates the coolant back through the fuel cell system 100 again.

It is, of course, desirable that most of the coolant flows through the fuel cells 124 where the coolant will serve to carry generated heat away from the fuel cells 124. Since heated coolant occupies a larger volume than unheated coolant, a greater amount of it will tend to flow into the coolant expansion tank 116 as the system heats up. To limit the amount of coolant that naturally circulates through the expansion tank 116, the inlet coolant line 130 is made restrictive to increase resistance to flow in comparison to the coolant flow fields through the fuel cells. Restricting the flow of coolant into the expansion tank will result in a low velocity flow of coolant through the tank. That is, the coolant that enters the tank will have a relatively long transit time within the tank (as compared to the flow through the fuel cells) before it leaves the tank and flows back into the outlet coolant manifold. During the longer transit time, any entrained gases in the coolant will have a greater opportunity to escape from the coolant. The escaped gases will then remain in the coolant expansion tank 116 and will not mix back in with the coolant when the coolant passes out into the outlet coolant manifold. The circulating coolant leaving the expansion tank, having less trapped or dissolved gas, will also tend to have a greater heat absorbing capacity. This also means that the previously trapped or dissolved gas will be less likely to become trapped in the fuel cells 124.

The coolant expansion tank 116 is made sufficiently large, or more specifically, the volume of air above the coolant in the coolant expansion tank 116 is made sufficiently large so as to accommodate the volume expansion of the heated coolant without causing the pressure within the coolant expansion tank 116 to increase excessively.

The release valve 118 located at the top of the coolant expansion tank 116 prevents the pressure in the coolant expansion tank 116 from exceeding a certain predetermined threshold beyond which the fuel cell system 100 might be damaged. The release valve 118 remains closed except when the threshold is exceeded, e.g., when the coolant expansion from heating exceeds a certain threshold, or when the release valve 118 is manually opened.

Before the fuel cell system 100 is turned on and the fuel cell reactions start, coolant is added to the fuel cell system 100. Any type of coolant/heat transfer fluid can be used in the fuel cell system 100, including an oil-based hydrocarbon such as Therminol® D-12 coolant/heat transfer fluid available from Solutia Inc. (St. Louis, Mo.).

The expansion tank 116 has two different level indicators for helping the user determine how much coolant to add to the system. There is a cold fill line 134 and a hot fill line 136. When the system is cold (e.g. <20° C.) and is initially charged with coolant, it is flowed into the system until it rises up to the cold fill line 134. If coolant is added at a later time when the system has been operating and is hot (e.g. >75° C.), coolant is added up to the hot fill line 136.

Coolant is added to the fuel cell system 100 from the bottom of the fuel cell system 100 at the end opposite the coolant expansion tank 116. More specifically, it is added through a fill valve 140 located below the bottom end plate 102 and above the pump 138. After opening the fill valve 140 and the release valve 118, coolant is flowed into to the fuel cell system using, for example, an electrical pump or a hand pump (not shown), which is securely connected to the fill valve 140. As coolant is introduced into the system, it will rise up through the fuel cell stack and eventually flow into the expansion tank 116. As it rises up into the fuel cell stack, it will flow into the channels of the coolant flow plates within the stack and it will push the air out ahead of it and through the open release valve 118. After the coolant reaches the cold fill line 134, the fill valve 140 and the release valve are closed and the system is ready to be started.

The fill valve 140 can, of course, also act as a drain valve for the fuel cell system 100.

Coolant can also be added to the fuel cell system 100 by opening the release valve 118 and pouring the coolant through the open valve. Coolant introduce in that way will flow down through the coolant expansion tank 116 and into the two manifolds 126 and 128. Filling the system in this way, however, will allow air to be trapped in the coolant plate flow channels within the fuel cell stack. That trapped air will have to be pushed out through operation of the pump 138.

Figure 2:
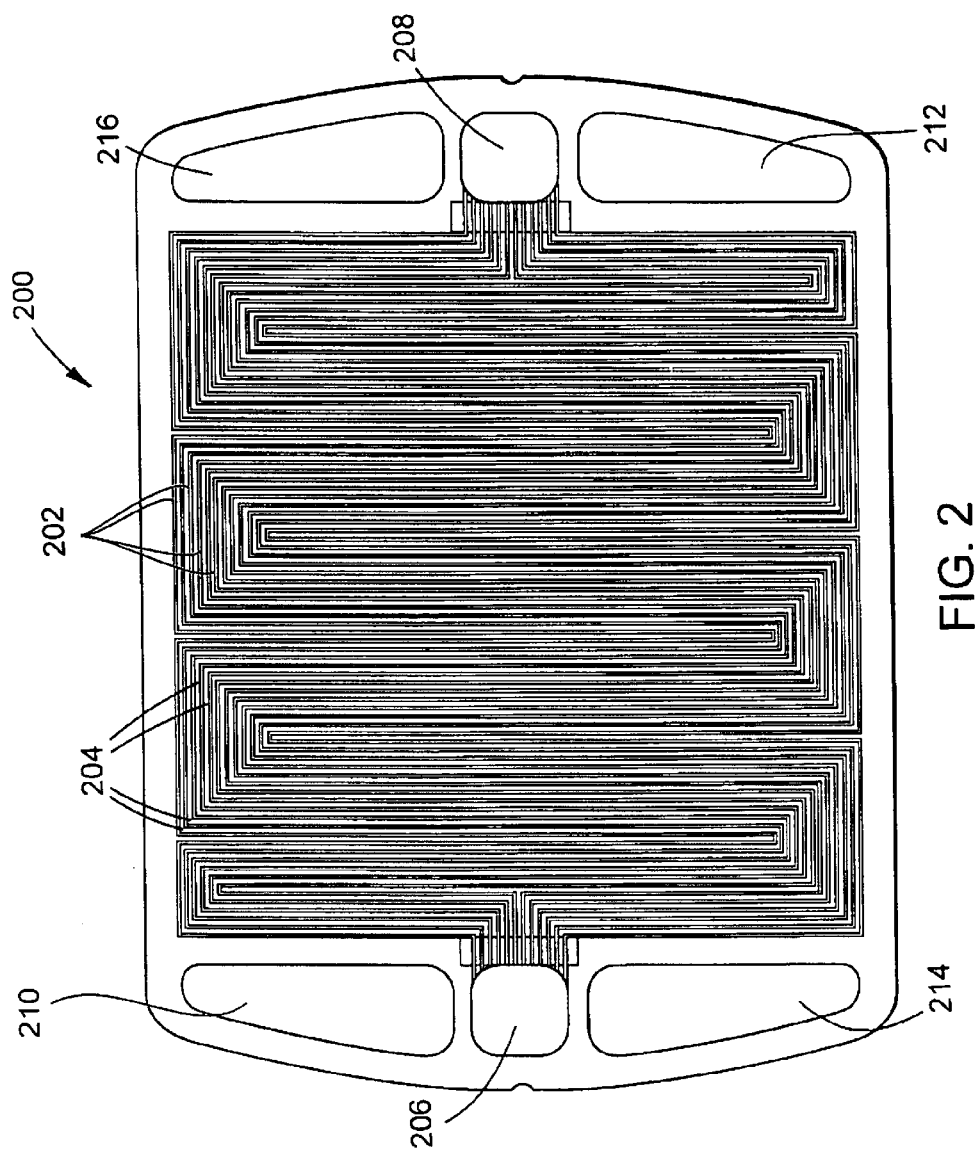
FIG. 2 shows a coolant flow field plate.

Further details about the design of the fuel cells in the described embodiment will now be provided. Each of the fuel cells 124 also includes flow field plates, flow channels, lands, a membrane or solid electrolyte, catalysts, and gas diffusion layers. Of particular relevance to the present invention, among these plates there are coolant flow field plates 200, an example of which is shown in FIG. 2. One side of the coolant flow field plate 200 includes one or more substantially parallel and/or generally serpentine coolant flow channel(s) 202 separated from each other by land(s) 204. The coolant flow channel(s) 202 receive and transmit one or more coolants through coolant holes 206, 208. In addition to separating the flow channels from each other, the land(s) 204 also serve as regions of electrical contact for allowing current to flow through the plate to the next fuel cell.

The land(s) 204 and the coolant flow field plate 200 can be formed from a material such as carbon composite, non-magnetic, austenitic stainless steel or titanium. Twelve flow channels 202 are shown in FIG. 2, but the coolant flow field plate 200 can include more or fewer channels, depending on design considerations.

When a plurality of the coolant flow field plates 200 are stacked on one another, the inlet coolant holes 206 align to form the inlet coolant manifold 126 (see FIG. 1) and the outlet coolant holes 208 align to form the outlet coolant manifold 128 (see FIG. 1). (Note that the other plates within the fuel cell stack also have holes in the same positions so that they also contribute to forming the manifolds.) These manifolds enable the coolant to communicate with and flow through the flow channels 202 of each of the coolant flow field plate.

The coolant flow field plate 200 also includes fuel input and exhaust holes 210 and 212 and air input and exhaust holes 214 and 216. As described above for the coolant manifolds 126 and 128, when a plurality of the coolant flow field plates 202 are stacked on one another, the fuel holes 210 and 212 align to form fuel input and exhaust manifolds and the air holes 214 and 216 align to form air input and exhaust manifolds.

The coolant flow field plate 200 is an independent flow field plate with coolant flow paths on one side of the coolant flow field plate 200. Within each fuel cell, the coolant flow field plate 200 is located between an anode flow field plate and a cathode flow field plate. The coolant flow field plate 200 could instead include coolant flow paths on both sides and/or be formed on one side of the anode flow field plate or the cathode flow field plate.

The anode flow field plate and the cathode flow field plate are structured similar to the coolant flow field plate 200. The anode flow field plate and the cathode flow field plate include flow field channels separated by lands that receive and transmit gas (hydrogen) and air (oxygen) respectively. The anode flow field plate and the cathode flow field plate also each include coolant holes, fuel holes, and air holes that align to form the manifolds described above.

As for other elements of the fuel cells, the solid electrolyte includes a solid polymer, e.g., a solid polymer ion exchange membrane, such as a solid polymer PEM, e.g., a solid polymer containing sulfonic acid groups. Such membranes are commercially available from E.I. DuPont de Nemours Company (Wilmington, Del.) under the trademark NAFION. Alternatively, the electrolyte can be prepared from the commercial product GORE-SELECT, available from W.L. Gore & Associates (Elkton, Md.).

The catalyst on the anode side includes material capable of interacting with molecular hydrogen to form protons and electrons. Such materials include, for example, platinum, platinum alloys, and platinum dispersed on carbon black. The catalytic material can be dispersed in one or more solvents, e.g., isopropanol, to form a suspension. The suspension is then applied to the surfaces of the solid electrolyte that face the gas diffusion layers and the suspension is then dried. Alternatively, the suspension can be applied to the surfaces of the gas diffusion layers that face the solid electrolyte, and the suspension is then dried. The method of preparing the catalyst may further include the use of heat, temperature, and/or pressure to achieve bonding.

The catalyst on the cathode side is formed of a material capable of interacting with molecular oxygen, electrons, and protons to form water. Examples of such materials include platinum, platinum alloys, and noble metals dispersed on carbon black. The catalyst can then be prepared as described above with respect to the catalyst.

The gas diffusion layers are formed of a material that is both gas and liquid permeable material so that the reactant gases, e.g., molecular hydrogen and molecular oxygen, and products, e.g., water, can pass therethrough. In addition, the gas diffusion layers should be electrically conductive so that electrons can flow from the catalyst to the flow field plate and from the flow field plate to the catalyst.

While certain embodiments of the invention, as well as their principals of operation, have been disclosed herein, the invention is not limited to these embodiments or these principals of operation. Other embodiments are in the claims.

What is claimed is:

1. A method of operating a fuel cell system, comprising:

flowing coolant through an inlet line to a fuel cell stack;

flowing the coolant from the fuel cell stack to a coolant expansion tank, the coolant capable of expanding into the coolant expansion tank;

flowing the coolant from the coolant expansion tank to the fuel cell stack; and restricting the flow of coolant from the fuel cell stack to the coolant expansion tank.

2. The method of claim 1, wherein the coolant flows from the coolant expansion to the fuel cell stack without flowing through the inlet line.

3. The method of claim 1, further comprising venting pressure in the coolant expansion tank.

4. The method of claim 1, wherein the coolant expansion tank is a sealed container.

5. The method of claim 1, further comprising regulating flow of coolant to the fuel cell stack through a valve.

6. The method of claim 1, further comprising indicating the level of coolant in the fuel cell system.

* * * * *